United States Patent
Huo et al.

(10) Patent No.: US 11,874,573 B2
(45) Date of Patent: Jan. 16, 2024

(54) TOUCH DISPLAY DEVICE

(71) Applicants: Ordos Yuansheng Optoelectronics Co., Ltd., Inner Mongolia (CN); BOE Technology Group Co., Ltd., Beijing (CN)

(72) Inventors: Peirong Huo, Beijing (CN); Shun Zhao, Beijing (CN); Peng Luo, Beijing (CN); Delong Zhong, Beijing (CN); Zhiqiang Wang, Beijing (CN)

(73) Assignees: Ordos Yuansheng Optoelectronics Co., Ltd., Inner Mongolia (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/777,836

(22) PCT Filed: Jan. 15, 2021

(86) PCT No.: PCT/CN2021/072019
§ 371 (c)(1),
(2) Date: May 18, 2022

(87) PCT Pub. No.: WO2021/147775
PCT Pub. Date: Jul. 29, 2021

(65) Prior Publication Data
US 2022/0413331 A1    Dec. 29, 2022

(30) Foreign Application Priority Data

Jan. 21, 2020   (CN) .......................... 202010072504.X

(51) Int. Cl.
*G02F 1/1362*   (2006.01)
*G02F 1/133*    (2006.01)
(Continued)

(52) U.S. Cl.
CPC .... *G02F 1/136218* (2021.01); *G02F 1/13306* (2013.01); *G02F 1/13338* (2013.01);
(Continued)

(58) Field of Classification Search
CPC ........ G06F 3/0412; G06F 3/044; G06F 3/045; G06F 2203/04107
See application file for complete search history.

(56) References Cited

U.S. PATENT DOCUMENTS

2015/0316812 A1* 11/2015 Mayumi ............... G06F 3/0418
                                                            349/40
2016/0291754 A1   10/2016 Jin
(Continued)

FOREIGN PATENT DOCUMENTS

CN    202229021 U    5/2012
CN    104536630 A    4/2015
(Continued)

OTHER PUBLICATIONS

Guo et al., CN 11018585 A machine translation (Year: 2019).*
(Continued)

*Primary Examiner* — Peter D McLoone
(74) *Attorney, Agent, or Firm* — IPro, PLLC

(57) ABSTRACT

A touch display device includes a backlight module (2) comprising a backlight iron frame (22); and a liquid crystal touch display panel (1) arranged on a light-emitting side of the backlight module; the liquid crystal touch display panel includes a touch electrode (11); and a compensation electrode (R) arranged on a side of the touch electrode facing the backlight module. The compensation electrode and the backlight iron frame are electrically connected with a ground signal terminal; and the touch electrode and the compensation electrode constitute a capacitor (C), a product of a capacitance value of the capacitor and a resistance value
(Continued)

of the compensation electrode is smaller than a pulse width of a touch signal applied on the touch electrode, and an order of magnitude of the product is smaller than an order of magnitude of the pulse width of the touch signal.

14 Claims, 7 Drawing Sheets

(51) Int. Cl.
| | | |
|---|---|---|
| *G02F 1/1333* | (2006.01) | |
| *G06F 3/041* | (2006.01) | |
| *G02F 1/1335* | (2006.01) | |
| *G06F 3/044* | (2006.01) | |
| *G06F 3/045* | (2006.01) | |
| *G02F 1/1343* | (2006.01) | |
| *G02F 1/1368* | (2006.01) | |

(52) U.S. Cl.
CPC .. *G02F 1/133512* (2013.01); *G02F 1/133514* (2013.01); *G06F 3/044* (2013.01); *G06F 3/045* (2013.01); *G06F 3/0412* (2013.01); *G02F 1/1368* (2013.01); *G02F 1/13439* (2013.01); *G06F 2203/04107* (2013.01)

(56) References Cited

U.S. PATENT DOCUMENTS

| | | |
|---|---|---|
| 2016/0357283 A1 | 12/2016 | Xu et al. |
| 2017/0038903 A1 | 2/2017 | Sun et al. |
| 2017/0185181 A1 | 6/2017 | Kim et al. |
| 2017/0212635 A1 | 7/2017 | Cordeiro et al. |
| 2017/0277329 A1 | 9/2017 | Ding et al. |
| 2018/0113343 A1 | 4/2018 | Huang et al. |
| 2018/0231853 A1 | 8/2018 | Yamamoto et al. |
| 2021/0333976 A1 | 10/2021 | Huang |
| 2022/0308410 A1 | 9/2022 | Hou et al. |

FOREIGN PATENT DOCUMENTS

| | | |
|---|---|---|
| CN | 104777681 A | 7/2015 |
| CN | 205193765 U | 4/2016 |
| CN | 105676509 A | 6/2016 |
| CN | 106293212 A | 1/2017 |
| CN | 106610745 A | 5/2017 |
| CN | 106775055 A | 5/2017 |
| CN | 110018585 A | 7/2019 |
| CN | 110471558 A | 11/2019 |
| CN | 111258457 A | 6/2020 |
| IN | 106575183 A | 4/2017 |
| JP | 2019087060 A | 6/2019 |
| KR | 20140098571 A | 8/2014 |
| KR | 20190080563 A | 7/2019 |

OTHER PUBLICATIONS

CN202010072504.X first office action.
PCT/CN2021/072019 international search report and written opinion.
PCT/CN2020/118436 international search report and written opinion.
CN202080002139.3 first office action.

* cited by examiner

TOUCH DISPLAY DEVICE

CROSS REFERENCE TO RELATED APPLICATIONS

The application is a national phase entry under 35 U.S.C. § 371 of International Application No. PCT/CN2021/072019, filed on Jan. 15, 2021, which claims the priority of the Chinese Patent Application No. 202010072504.X, filed to the China National Intellectual Property Administration on Jan. 21, 2020 and entitled "Touch Display Device", the entire contents of which are incorporated herein by reference.

FIELD

The present disclosure relates to a display device, in particular to a touch display device.

BACKGROUND

An in cell touch display device integrates a touch electrode in a display panel, and realizes the touch function and display function of the display panel by means of time-division driving. Since an in cell touch technology does not need to separately manufacture a touch function layer after the display panel manufacturing process, the manufacturing process of the touch display device is simplified, and the thin design of the display device is facilitated. Therefore, the in cell touch design has become a mainstream design solution for the touch display device.

The in cell touch technology is widely used in a liquid crystal display device. As shown in FIG. 1, the liquid crystal display device includes: a liquid crystal touch display panel 1 and a backlight module 2 that are oppositely disposed. A touch electrode 11 is integrated in the liquid crystal touch display panel 1, and the backlight module 2 includes an optical film layer 21 and a backlight iron frame 22 supporting the optical film layer 21; and the touch electrode 11 is electrically connected to a touch signal input terminal, the backlight iron frame 22 is grounded, and a capacitor $C_0$ is formed between the touch electrode 11 and the backlight iron frame 22. When a chip (IC) applies a periodic high-frequency square pulse signal on the touch electrode 11 through the touch signal input terminal, since the pulse signal is positive or negative, an electric field formed between the touch electrode 11 and the backlight iron frame 22 will induce positive or negative charges, so that polarizers, diffusers, light guide plates and other dielectric material film layers between the touch electrode 11 and the backlight iron frame 22 produce an electrostrictive effect. The polarizers, the diffusers, the light guide plates and other film layers will be deformed laterally and longitudinally, and finally the surface of the capacitor $C_0$ formed between the touch electrode 11 and the backlight iron frame 22 will vibrate, and users can hear sound, thereby affecting the use effect of a product.

SUMMARY

A touch display device provided by embodiments of the present disclosure is configured to solve the problems in the background art.

Therefore, the embodiments of the present disclosure provide a touch display device, including:
a backlight module, including a backlight iron frame; and
a liquid crystal touch display panel arranged on a light-emitting side of the backlight module;
the liquid crystal touch display panel includes: a touch electrode and a compensation electrode arranged on a side of the touch electrode facing the backlight module, and the compensation electrode and the backlight iron frame are electrically connected with a ground signal terminal; and the touch electrode and the compensation electrode constitute a capacitor, a product of a capacitance value of the capacitor and a resistance value of the compensation electrode is smaller than a pulse width of a touch signal applied on the touch electrode, and an order of magnitude of the product is smaller than an order of magnitude of the pulse width of the touch signal.

Optionally, the liquid crystal touch display panel includes: an array substrate and a color filter substrate disposed opposite to each other, and a liquid crystal layer arranged between the array substrate and the color filter substrate; the backlight module is arranged on a side of the array substrate away from the color filter substrate;
the touch electrode is integrated in the array substrate, or the touch electrode is integrated in the color filter substrate; and the compensation electrode is arranged in the array substrate.

Optionally, the array substrate is provided with a base substrate, and the compensation electrode is disposed in contact with the base substrate.

Optionally, the compensation electrode is arranged on a side of the base substrate close to the touch electrode.

Optionally, the compensation electrode is arranged on a side, away from the touch electrode, of the base substrate.

Optionally, the base substrate is provided with a display region and a non-display region surrounding the display region, and the compensation electrode is arranged in the display region; and the color filter substrate is provided with a black matrix, and an orthographic projection, on the base substrate, of the compensation electrode is arranged within an orthographic projection, on the base substrate, of the black matrix.

Optionally, the base substrate is provided with a display region and a non-display region surrounding the display region, and the compensation electrode is arranged in the non-display region and surrounds the display region.

Optionally, a material of the compensation electrode is metal.

Optionally, the compensation electrode is disposed on a whole surface, and an orthographic projection area of the backlight iron frame on a surface where the compensation electrode is located is the same as an area of the compensation electrode.

Optionally, a material of the compensation electrode is a transparent conductive material.

Optionally, the backlight module further includes an optical film layer located on a side of the backlight iron frame facing the liquid crystal touch display panel, the backlight iron frame is configured to support the optical film layer, and the optical film layer at least includes a light guide plate and a diffuser which are sequentially disposed in a stacked mode.

DETAILED DESCRIPTION OF THE EMBODIMENTS

In order to make the objectives, technical solutions, and advantages of the present disclosure clearer, a touch display device provided by the present disclosure will be further described in detail below with reference to the accompanying drawings. Apparently, the described embodiments are some, but not all, embodiments of the present disclosure. Based on the embodiments of the present disclosure, all other embodiments attainable by those ordinarily skilled in the art without involving any inventive effort are within the protection scope of the present disclosure.

The shapes and dimensions of various components in the accompanying drawings are not to truly scale and are intended to be merely illustrative of the contents of the present disclosure.

Touch is touch sensing technology based on charge transmission, which utilizes a physical principle of charge retention, that is, a switch can be used to apply a voltage to a sensing electrode in a short period of time to charge the sensing electrode, and then disconnects the switch, uses a second switch to release the charge on the sensing electrode to a larger sampling capacitor. By measuring the charge over a plurality of charge-transmission cycles, the capacitance of the sensing electrode may be determined. Therefore, the Touch function of a Full In Cell product is achieved, and an IC needs to output modulation (high-frequency square waves) to a touch electrode.

Figure 1:
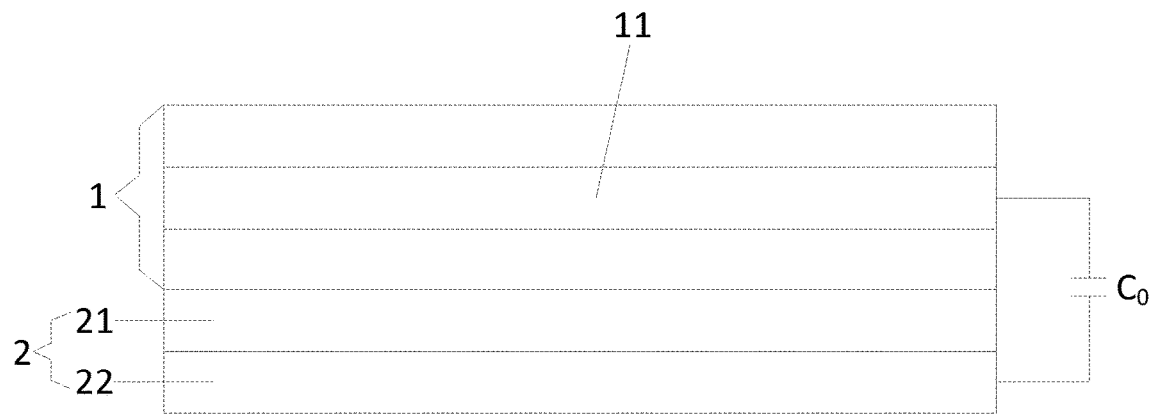
FIG. 1 is a first schematic structural diagram of a liquid crystal touch display device in the related art.
Figure 2:
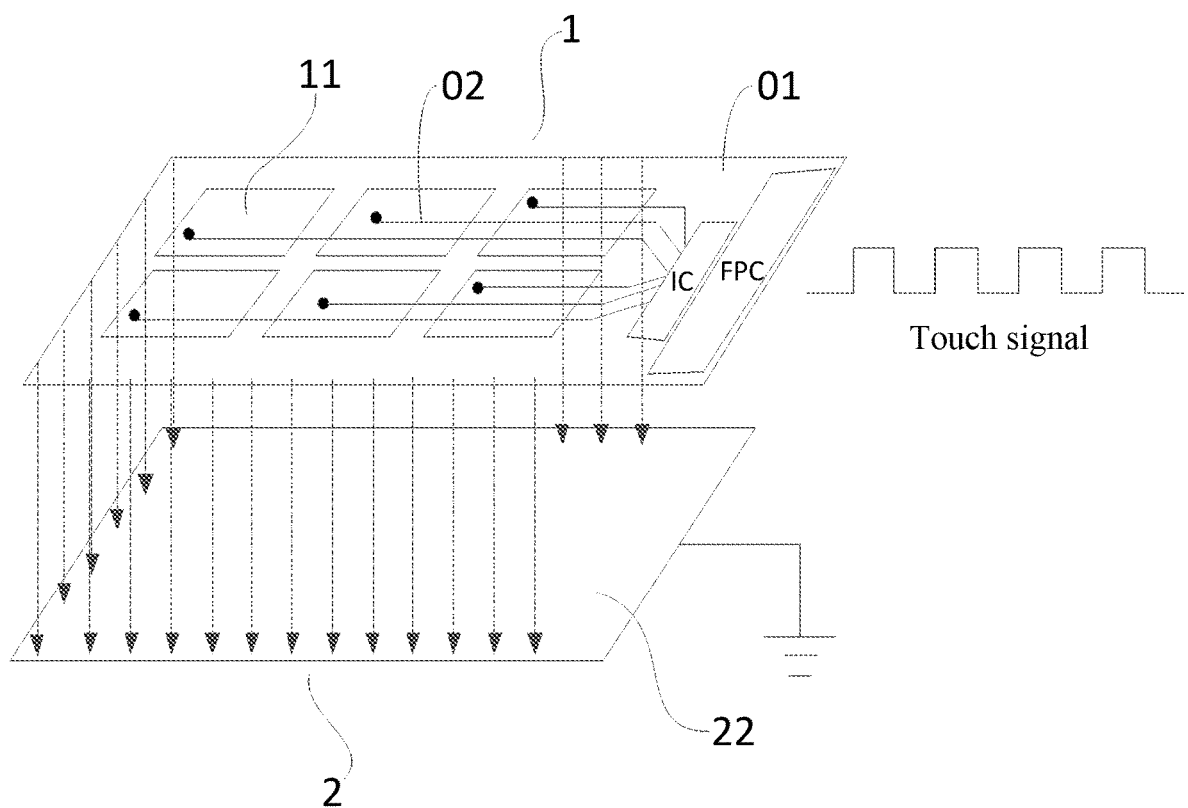
FIG. 2 is a second schematic structural diagram of a liquid crystal touch display device in the related art.

First, an induced charge is generated between a backlight iron frame and touch electrodes of a liquid crystal touch display device in the related art, so that polarizers, diffusers, light guide plates and other dielectric material film layers sandwiched between the touch electrodes and the backlight iron frame generate an electrostrictive effect, which will be described in detail. As shown in FIG. 2, the liquid crystal touch display device includes a liquid crystal touch display panel 1 and a backlight module 2 arranged on a light incident side of the liquid crystal touch display panel 1. The liquid crystal touch display panel 1 includes a base substrate 01, touch electrodes 11 integrated in the liquid crystal touch display panel 1, and leads 02 electrically connected to the touch electrodes 11, each lead 02 is electrically connected to an IC, and the IC is electrically connected to a flexible printed circuit (FPC), the touch electrodes 11 are electrically connected to a touch signal input terminal, and a high-frequency square pulse signal is applied to each touch electrode through the IC; and the backlight module 2 includes a backlight iron frame 22, and the backlight iron frame 22 is grounded. That is, when the product reaches a module stage, after the backlight iron frame 22 is assembled, the backlight iron frame 22 and the touch electrodes 11 inside Panel constitute a capacitor. After the high-frequency pulse signal is applied between capacitor plates, a lower polarizer between the touch electrodes 11 and the backlight iron frame 22 and each film layer of the backlight will undergo electrostriction, that is, an inverse piezoelectric effect. In this way, when a touch signal is applied to the touch electrodes 11, under the action of an AC electric field, the electric field (shown by a dashed arrow) formed between the touch electrodes 11 and the backlight iron frame 22 will generate induced charges, so that the polarizers, the diffusers, the light guide plates and other dielectric material film layers sandwiched between the touch electrodes 11 and the backlight iron frame 22 generate the electrostrictive effect, which is finally manifested as vibrations on the surface of the capacitor formed between the touch electrodes 11 and the backlight iron frame 22, the sound may be heard and the whistling problem occurs, the normal use of users is affected or the use experience of the users is reduced, which has become a major problem for mobile phone products in the industry.

Figure 3:
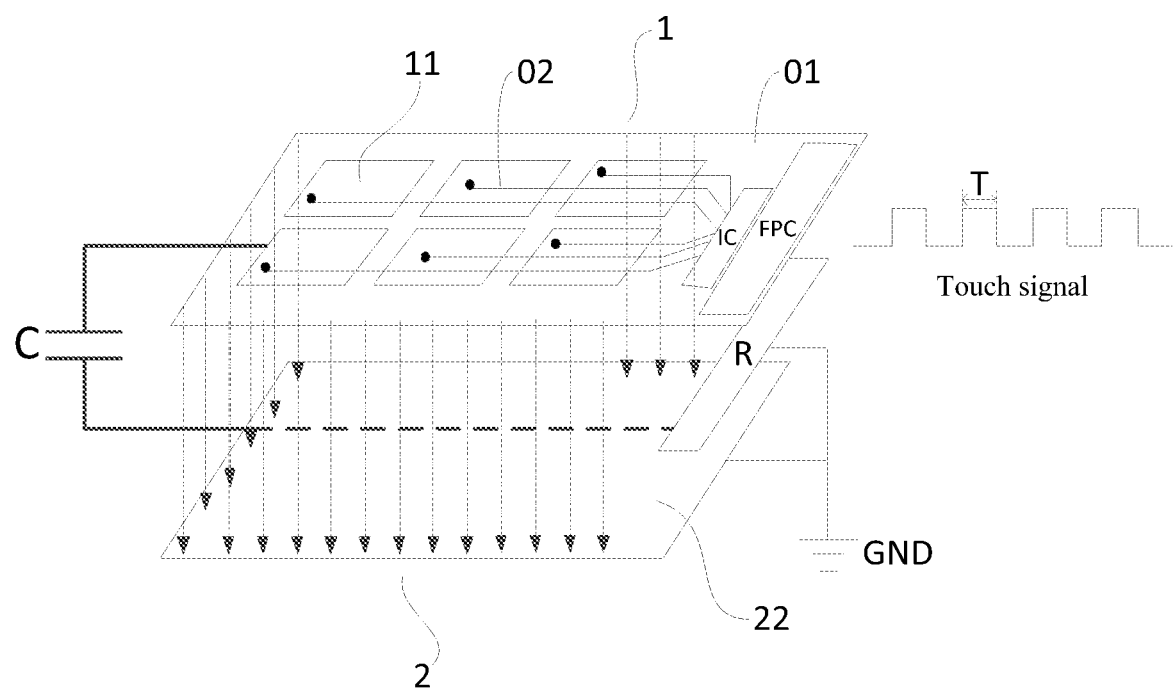
FIG. 3 is a first schematic structural diagram of a touch display device provided by an embodiment of the present disclosure.

In view of this, the embodiments of the present disclosure provide a touch display device, as shown in FIG. 3, including:

a backlight module 2 including a backlight iron frame 22; and a liquid crystal touch display panel 1 arranged on a light-emitting side of the backlight module 2, that is, the backlight module 2 is arranged on a light incident side of the liquid crystal touch display panel 1, the liquid crystal touch display panel 1 includes: touch electrodes 11 and a compensation electrode R arranged on a side of the touch electrodes 11 facing the backlight module 2, and the compensation electrode R and the backlight iron frame 22 are electrically connected with a ground signal terminal GND; and the touch electrodes 11 and the compensation electrode R constitute a capacitor C, a product of a capacitance value of the capacitor C and a resistance value of the compensation electrode R is smaller than a pulse width T of a touch signal applied on the touch electrodes 11, and an order of magnitude of the product is smaller than an order of magnitude of the pulse width T of the touch signal.

Figure 4:
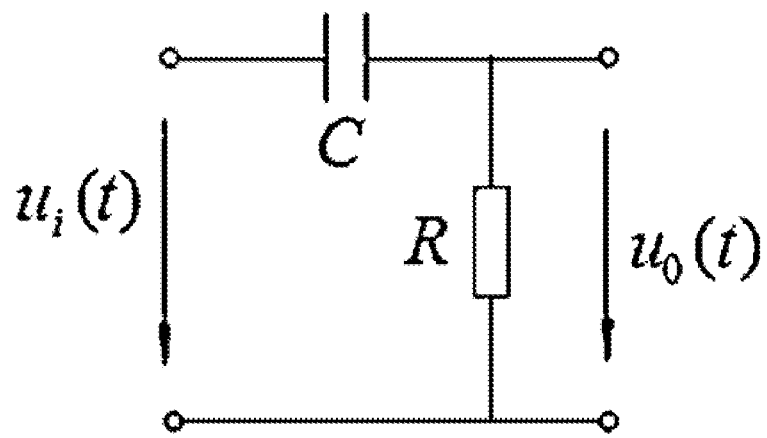
FIG. 4 is a schematic diagram of an RC differential circuit.
Figure 5:
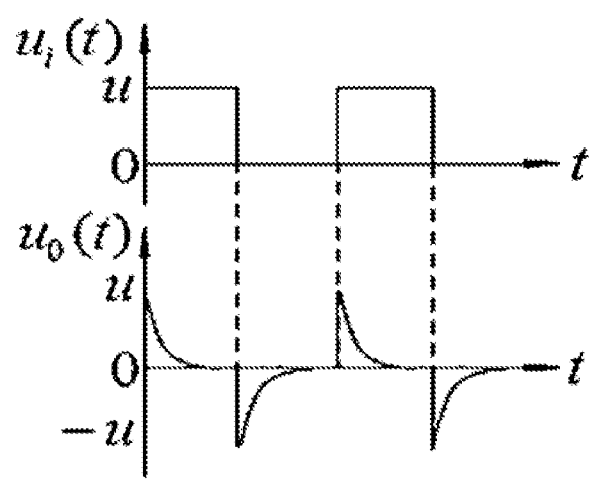
FIG. 5 is a schematic diagram of waveform conversion corresponding to FIG. 4.

In the above-mentioned touch display device provided by the embodiments of the present disclosure, the compensation electrode is disposed on the side of the touch electrodes facing the backlight module in the liquid crystal touch display panel, so that the touch electrodes and the compensation electrode constitute the capacitor, and the capacitor and the compensation electrode constitute an RC differential circuit, the circuit structure is shown in FIG. 4, $u_i(t)$ represents an input voltage, $u_o(t)$ represents an output voltage, the RC differential circuit may convert a rectangular wave into a spike pulse wave, as shown in FIG. 5, an upper waveform diagram in FIG. 5 represents the touch signal (rectangular pulse) applied on the touch electrodes, a lower waveform diagram in FIG. 5 shows a spike pulse output after the touch signal on the touch electrodes passes through the RC differential circuit, a width T of the output spike pulse waveform is related to R*C (i.e., a time constant of the circuit), the smaller the R*C is, the sharper the spike pulse waveform is, and vice versa, the R*C of this circuit must be much smaller than the width of the input waveform, otherwise it will lose the function of waveform transformation and become a general RC coupling circuit, generally the R*C is smaller than or equal to 1/10 of the width of the input waveform, that is, the charging and discharging speed of the capacitor C is extremely high during operation, and an output signal will therefore have bidirectional peaks (close to the input signal amplitude), that is, the compensation electrode R (output end) outputs the spike pulse wave, the same amount of positive charges and negative charges are induced between the compensation electrode R and the backlight iron frame 22, and the positive charges and the negative charges are neutralized, so that the electric field-induced electric charge is 0. Since the compensation electrode 6 added in the present disclosure is disposed in the liquid crystal touch display panel and arranged on the side of the touch electrodes 11 facing the backlight module 2, light guide plates, diffusers, polarizers and other dielectric material layers between the liquid crystal touch display panel and the backlight iron frame 22 are also arranged between the compensation electrode R and the backlight iron frame 22, and therefore, the light guide plates, the diffusers, the polarizers, and other dielectric material layers do not undergo charge induction, and electrically-induced contraction is not generated. Therefore, the capacitor formed by the touch electrodes 11 and the backlight iron frame 22 will not vibrate, and the problem of howling of the liquid crystal touch display panel is solved, thereby improving the use effect of the product.

During specific implementation, a touch mode provided by the embodiments of the present disclosure may be self-capacitive touch, the touch electrodes 11 are block-shaped and distributed in an array, and the touch electrodes 11 and leads 02 may be arranged on different layers and are connected through via holes.

During specific implementation, an electrical connection between the above-mentioned backlight iron frame and the ground signal terminal may eliminate static electricity formed on the surface of the backlight iron frame.

During specific implementation, according to the pulse width T of different charging pulse signals applied corresponding to the touch electrodes of various types of liquid crystal product model at present, the touch electrodes can be matched with compensation electrodes R with different resistance values in series to form the RC differential circuit, so as to ensure that the capacitor C constituted by the compensation electrode R and the touch electrodes connected in series satisfies the relationship of the RC differential circuit, that is, RC<<T, thereby realizing the function of the waveform transformation of the RC differential circuit.

Figure 6:
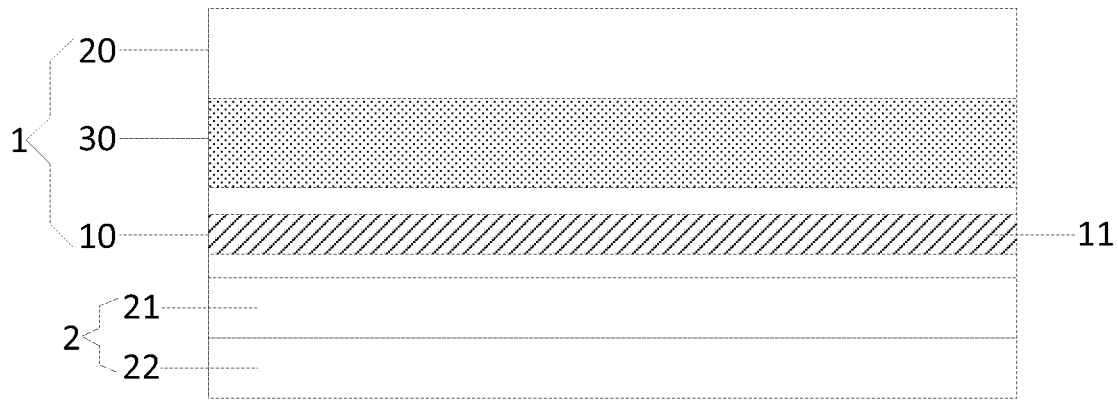
FIG. 6 is a second schematic structural diagram of a touch display device provided by an embodiment of the present disclosure.
Figure 7:
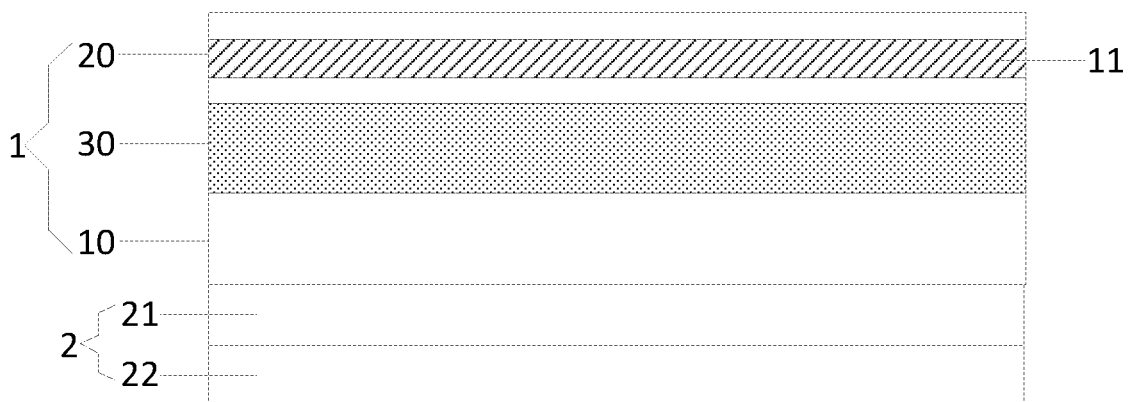
FIG. 7 is a third schematic structural diagram of a touch display device provided by an embodiment of the present disclosure.

During specific implementation, in the above-mentioned touch display device provided by the embodiments of the present disclosure, as shown in FIG. 6 and FIG. 7, the liquid crystal touch display panel 1 includes: an array substrate 10 and a color filter substrate 20 disposed oppositely, and a liquid crystal layer 30 arranged between the array substrate 10 and the color filter substrate 20; the backlight module 2 is arranged on a side of the array substrate 10 facing away from the color filter substrate 20; specifically, the array substrate 10 includes a plurality of pixel units arranged in an array, a plurality of thin film transistors and metal traces; the color filter substrate 20 at least includes red, green, and blue color resistance units arranged in an array and a black matrix disposed between adjacent color resistance units; and the color filter substrate 20 is configured to enable the display panel realize color display.

As shown in FIG. 6, the touch electrodes 11 are integrated in the array substrate 10; or as shown in FIG. 7, the touch electrodes 11 are integrated in the color filter substrate 20.

The compensation electrode R is arranged in the array substrate 10 (the compensation electrode R is not shown in FIG. 6 and FIG. 7).

Figure 8:
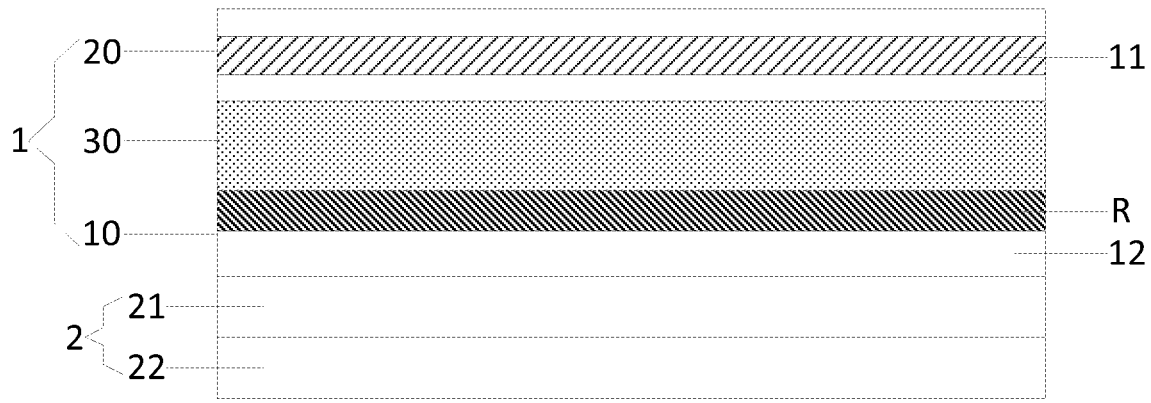
FIG. 8 is a fourth schematic structural diagram of a touch display device provided by an embodiment of the present disclosure.
Figure 9:
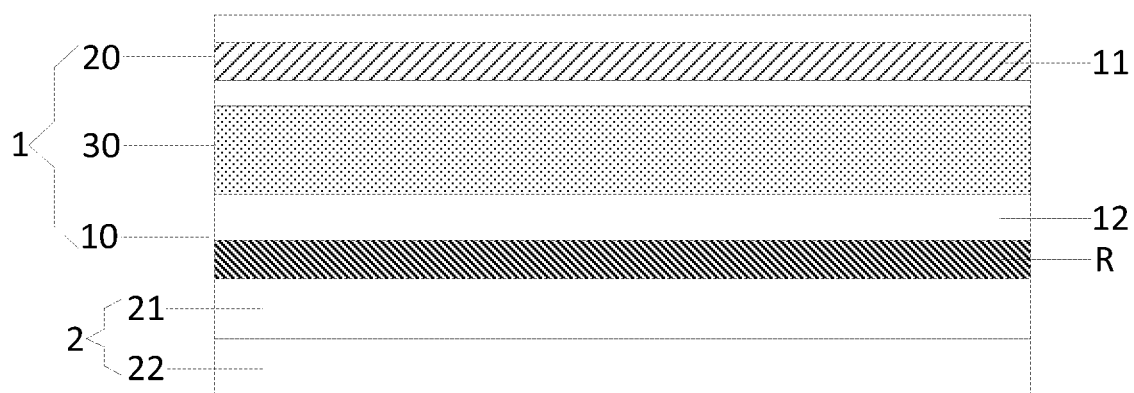
FIG. 9 is a fifth schematic structural diagram of a touch display device provided by an embodiment of the present disclosure.

During specific implementation, in the above-mentioned touch display device provided by the embodiments of the present disclosure, as shown in FIG. 8 and FIG. 9, taking the touch electrodes 11 integrated in the color filter substrate 20 as an example for illustration, the array substrate 10 has a base substrate 12, and the compensation electrode R is disposed in contact with the base substrate 12. Specifically, polarizers are also disposed on the upper and lower surfaces of the liquid crystal touch display panel 1, that is, the polarizer is disposed on the side of the base substrate 12 of the array substrate 10 close to the backlight module 2, and the polarizer is disposed on one side of a base substrate of the color filter substrate 20 away from the array substrate 10. The present disclosure is to solve the problem that the polarizers, the diffusers, the light guide plates and other dielectric material layers between the touch electrodes 11 and the backlight iron frame 22 of the backlight module 2 will not generate electrostriction, so that the compensation electrode R and the base substrate 12 of the array substrate 10 are disposed in contact, and thus the polarizers, the diffusers, the light guide plates and other dielectric material layers are arranged between the compensation electrode R and the backlight iron frame 22. Through the function of the RC differential circuit, the polarizers, the diffusers, the light guide plates and other dielectric material layers will not generate electrostriction, and the compensation electrode R will also not affect the touch display function of the liquid crystal touch display panel.

During specific implementation, in the above-mentioned touch display device provided by the embodiments of the present disclosure, as shown in FIG. 8, the compensation electrode R may be arranged on the side of the base substrate 12 close to the touch electrodes 11; or as shown in FIG. 9, the compensation electrode R may also be arranged on the side of the base substrate 12 facing away from the touch electrodes 11. The compensation electrode R is disposed on the surface of the base substrate 12, which will not affect the fabrication of other functional film layers in the array substrate and the color filter substrate, and thus will not cause defects in the liquid crystal touch display panel.

During specific implementation, in the above-mentioned touch display device provided by the embodiments of the present disclosure, the base substrate has a display region and a non-display region surrounding the display region, and the compensation electrode is arranged in the display region; and the color filter substrate has a black matrix, and an orthographic projection of the compensation electrode on the base substrate is located within an orthographic projection of the black matrix on the base substrate. By arranging the compensation electrode to be located within the orthographic projection of the black matrix, the arrangement of the compensation electrode not only does not affect the aperture ratio of pixels in the panel, but also enables the polarizers, the diffusers, the light guide plates and other dielectric material layers between the touch electrodes and the backlight iron frame do not undergo electrostriction. Specifically, the compensation electrode may be electrically connected to the ground terminal GND on a flexible printed circuit (FPC) through via holes penetrating through an insulating layer in the panel. The material of the compensation electrode may be metal (Al, Mg, etc.) or a transparent conductive material (ITO, etc.).

Figure 10:
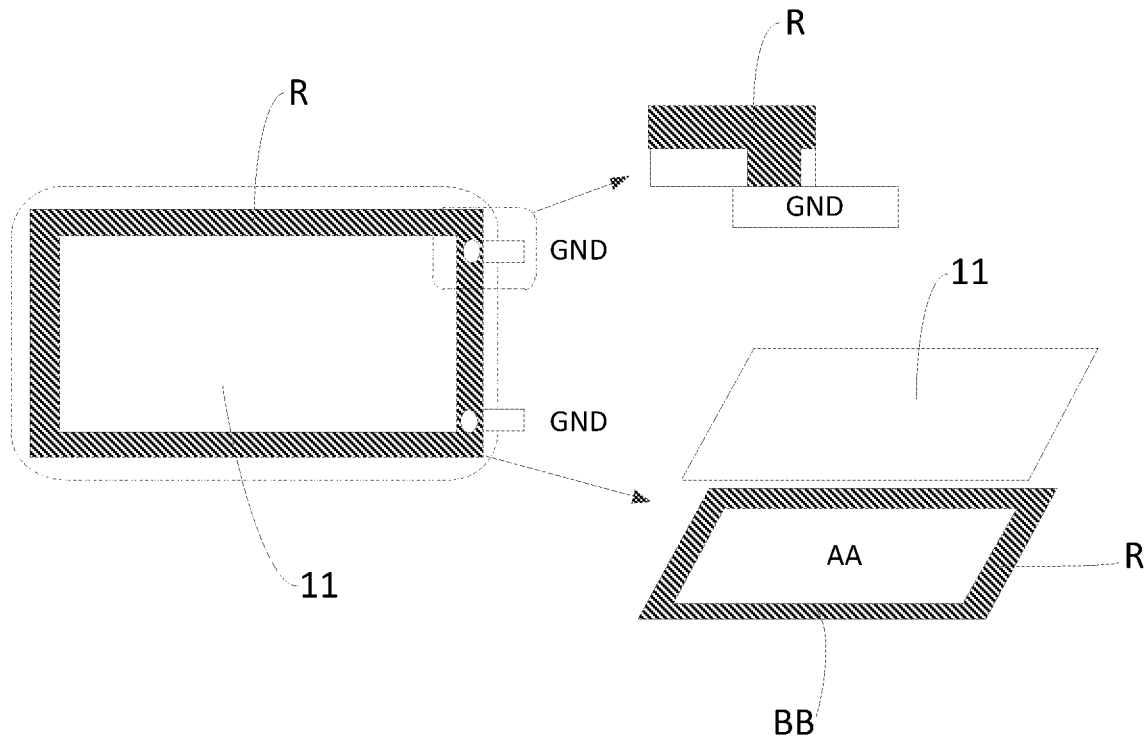
FIG. 10 is a sixth schematic structural diagram of a touch display device provided by an embodiment of the present disclosure.

During specific implementation, in order to further prevent the setting of the compensation electrode from causing other undesirable problems in the liquid crystal touch display panel, in the above-mentioned touch display device provided by the embodiments of the present disclosure, as shown in FIG. 10, the base substrate has a display region and a non-display region surrounding the display region, and the compensation electrode R is arranged in the non-display region and surrounds the display region. Specifically, the compensation electrode R may be electrically connected to ground terminal GND pins (PIN) on the flexible printed circuit (FPC) through the via holes penetrating the insulating layer in the panel. The material of the compensation electrode may be metal (Al, Mg, etc.) or a transparent conductive material (ITO, etc.).

During specific implementation, in the above-mentioned touch display device provided by the embodiments of the present disclosure, the compensation electrode may also be disposed on the whole surface, and an orthographic projection area of the backlight iron frame on the surface where the compensation electrode is located is the same as an area of the compensation electrode. The material of the compensation electrode is the transparent conductive material (such as, ITO, etc.).

During specific implementation, in the above-mentioned touch display device provided by the embodiments of the present disclosure, as shown in FIG. 8 and FIG. 9, the backlight module 2 further includes an optical film layer 21 on the side of the backlight iron frame 22 facing the liquid crystal touch display panel 1, the backlight iron frame 22 is configured to support the optical film layer 21, and the optical film layer 21 at least includes light guide plates and diffusers (not shown in the figure) stacked in sequence. Specifically, the light guide plates are configured to conduct light, and the diffusers are configured to diffuse light, so as to ensure that the backlight module 2 provides uniform and stable light to the liquid crystal touch display panel 1.

Of course, during specific implementation, the above-mentioned optical film layer also includes other functional film layers well known to those skilled in the art, which will not be described in detail here.

Figure 11:
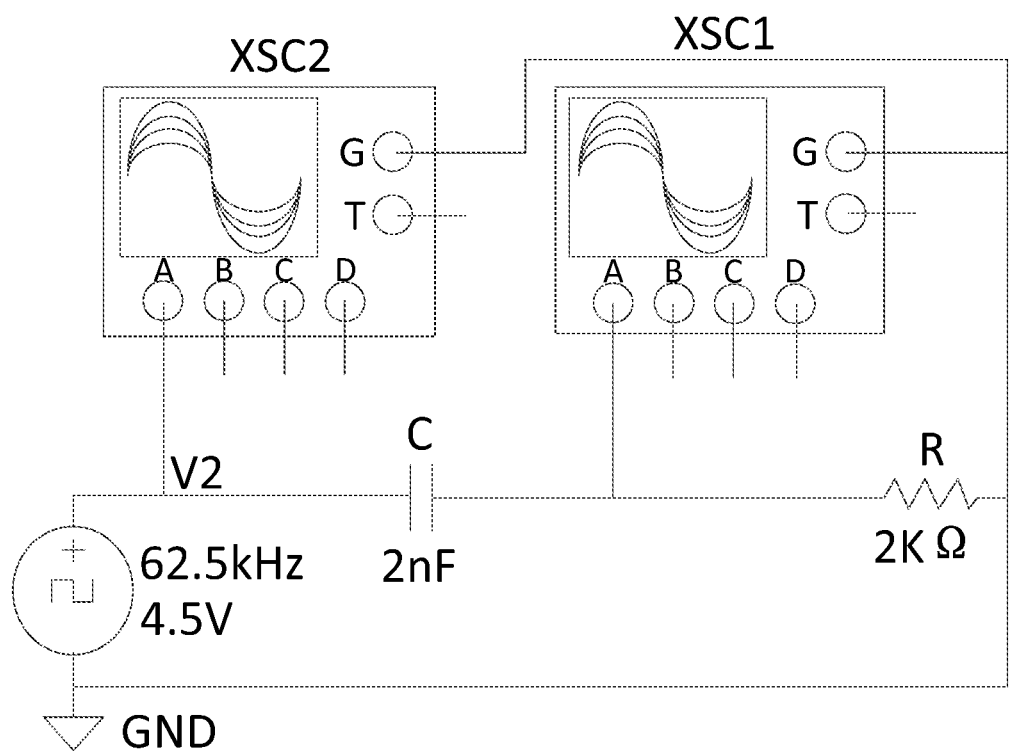
FIG. 11 is a simulation circuit diagram of a touch display device provided by an embodiment of the present disclosure.
Figure 12:
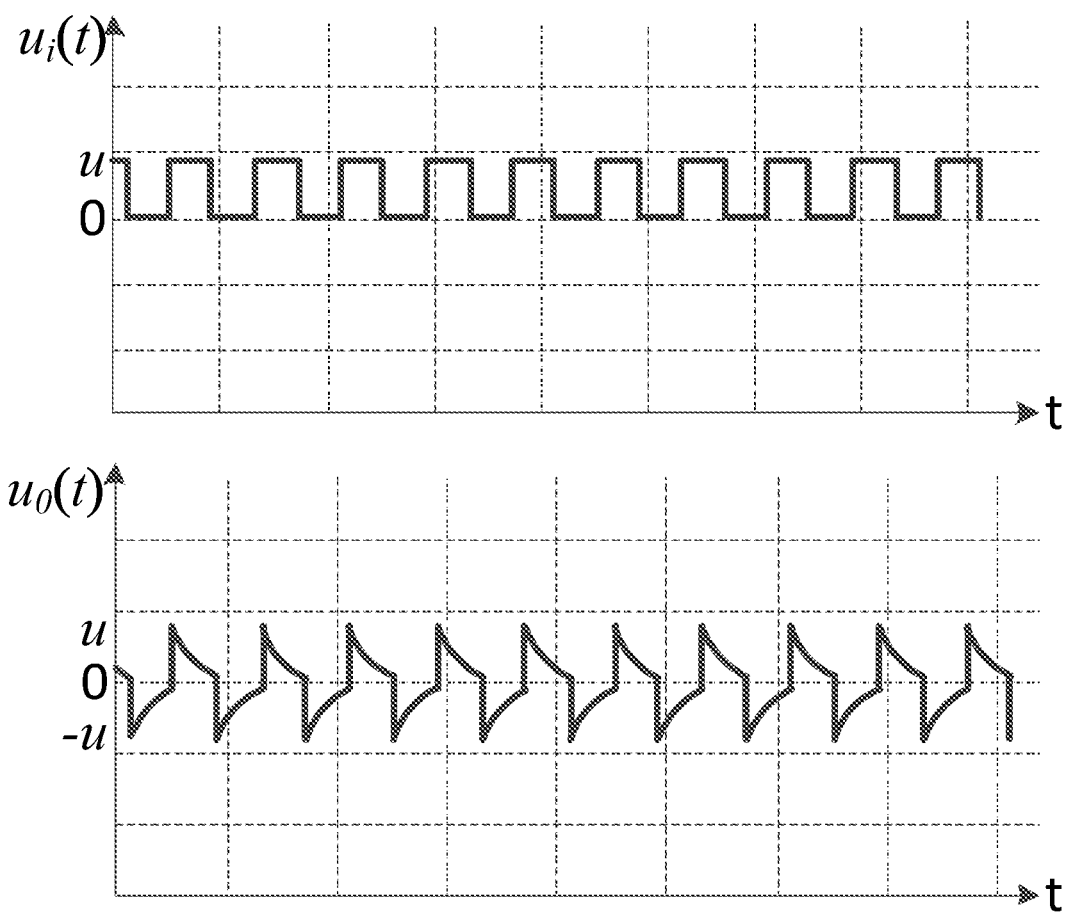
FIG. 12 is a schematic diagram of waveform conversion obtained by simulation in FIG. 11 according to the present disclosure.

The waveform after the compensation electrode added to the touch display device provided by the embodiments of the present disclosure and the backlight iron frame are grounded are simulated below. Specifically, as shown in FIG. 11, XSC1 and XSC2 are oscilloscopes, XSC1 is a signal output terminal, XSC2 is a touch signal input terminal, where the product of the capacitance value of the capacitor C and the resistance value of the compensation electrode R is significantly less than the pulse width of the touch signal applied on the touch electrodes, so that the touch signal (rectangular anti-wave signal) as shown in FIG. 12 (top) is applied to the touch electrodes through XSC2, after passing through the RC circuit, the signal output by XSC1 is shown in FIG. 12 (bottom), and it can be seen that the output waveform is a positive and negative spike pulse waveform. It can be seen that after the compensation electrode R is disposed in the touch display device of the present disclosure, the rectangular anti-wave signal on the touch electrodes may be changed into the positive and negative spike pulse waveform, that is, the compensation electrode R (output end) outputs the spike pulse wave, due to the action of the electric field, the same amount of positive charges and negative charges are induced between the compensation electrode R and the backlight iron frame 22, and the positive charges and the negative charges are neutralized, that is, the electric field-induced charge is 0, and thus the light guide plates, the diffusers, the polarizers and other dielectric material layers between the compensation electrode R and the backlight iron frame do not undergo charge induction, and electrically-induced contraction is not generated, so that the capacitor formed by the touch electrodes and the backlight iron frame will not vibrate, and the use effect of the product is improved.

The above-mentioned touch display device provided by the embodiments of the present disclosure may be any product or component with a display function, such as a mobile phone, a tablet computer, a television, a monitor, a notebook computer, a digital photo frame, and a navigator.

In the above-mentioned touch display device provided by the embodiments of the present disclosure, the compensation electrode is disposed on the side of the touch electrodes facing the backlight module in the liquid crystal touch display panel, so that the touch electrodes and the compensation electrode constitute the capacitor, and the capacitor and the compensation electrode constitute the RC differential circuit. Since the product of the capacitance value of the capacitor and the resistance value of the compensation electrode is smaller than the pulse width of the touch signal applied on the touch electrodes, and an order of magnitude of the product of the capacitance value of the capacitor and the resistance value of the compensation electrode is smaller than an order of magnitude of the pulse width of the touch signal, that is, the product of the capacitance value of the capacitor and the resistance value of the compensation electrode is significantly smaller than the pulse width of the touch signal applied on the touch electrodes, when the touch signal (usually a high-frequency square pulse signal) is input to the touch electrode, the RC differential circuit may convert square pulse signals having the same polarity into spike pulse waves having a positive and negative polarity, that is, the compensation electrode (output end) outputs the spike pulse waves, and the same amount of positive charges and negative charges are induced between the compensation electrode and the backlight iron frame, and the positive charges and the negative charges are neutralized. Since the compensation electrode added in the present disclosure is disposed in the liquid crystal touch display panel and arranged on the side of the touch electrodes facing the backlight module, the light guide plates, the diffusers, the polarizers and other dielectric material layers between the liquid crystal touch display panel and the backlight iron frame are also arranged between the compensation electrode and the backlight iron frame, the light guide plates, the diffusers, the polarizers and other dielectric material layers do not undergo charge induction, and electrically-induced contraction is not generated, so that the capacitor formed by the touch electrodes and the backlight iron frame will not vibrate, and the use effect of the product is improved.

It will be apparent to those skilled in the art that various modifications and variations can be made in the present disclosure without departing from the spirit or scope of the present disclosure. Thus, if these modifications and variations of the present disclosure fall within the scope of the claims of the present disclosure and its equivalent technology, the present disclosure is also intended to include these modifications and variations.

What is claimed is:

1. A touch display device, comprising:
a backlight module comprising a backlight iron frame; and
a liquid crystal touch display panel arranged on a light-emitting side of the backlight module;
wherein the liquid crystal touch display panel comprises:
a touch electrode; and
a compensation electrode arranged on a side of the touch electrode facing the backlight module;
wherein the compensation electrode and the backlight iron frame are electrically connected with a ground signal terminal; and the touch electrode and the compensation electrode constitute a capacitor, a product of a capacitance value of the capacitor and a resistance value of the compensation electrode is smaller than a pulse width of a touch signal applied on the touch electrode, and an order of magnitude of the product is smaller than an order of magnitude of the pulse width of the touch signal.

2. The touch display device according to claim 1, wherein:
the liquid crystal touch display panel comprises:
an array substrate and a color filter substrate disposed opposite to each other; and
a liquid crystal layer arranged between the array substrate and the color filter substrate; wherein the backlight module is arranged on a side of the array substrate away from the color filter substrate;
the touch electrode is integrated in the array substrate, or the touch electrode is integrated in the color filter substrate; and
the compensation electrode is arranged in the array substrate.

3. The touch display device according to claim 2, wherein the array substrate is provided with a base substrate, and the compensation electrode is disposed in contact with the base substrate.

4. The touch display device according to claim 3, wherein the compensation electrode is arranged on a side of the base substrate close to the touch electrode.

5. The touch display device according to claim 3, wherein the compensation electrode is arranged on a side, away from the touch electrode, of the base substrate.

6. The touch display device according to claim 3, wherein the base substrate is provided with a display region and a non-display region surrounding the display region, and the compensation electrode is arranged in the display region; and
the color filter substrate is provided with a black matrix, and an orthographic projection, on the base substrate, of the compensation electrode is arranged within an orthographic projection, on the base substrate, of the black matrix.

7. The touch display device according to claim 6, wherein a material of the compensation electrode is metal.

8. The touch display device according to claim 6, wherein a material of the compensation electrode is a transparent conductive material.

9. The touch display device according to claim 3, wherein the base substrate is provided with a display region and a non-display region surrounding the display region, and the compensation electrode is arranged in the non-display region and surrounds the display region.

10. The touch display device according to claim 9, wherein a material of the compensation electrode is metal.

11. The touch display device according to claim 9, wherein a material of the compensation electrode is a transparent conductive material.

12. The touch display device according to claim 1, wherein the compensation electrode is disposed on a whole surface, and an orthographic projection area, on a surface where the compensation electrode is located, of the backlight iron frame is the same as an area of the compensation electrode.

13. The touch display device according to claim 12, wherein a material of the compensation electrode is a transparent conductive material.

14. The touch display device according to claim 1, wherein the backlight module further comprises an optical film layer arranged on a side of the backlight iron frame facing the liquid crystal touch display panel, the backlight iron frame is configured to support the optical film layer, and the optical film layer at least comprises a light guide plate and a diffuser which are sequentially disposed in a stacked mode.

* * * * *